INVENTORS
ROBERT D. HAWKINS
HAMILTON SOUTHWORTH JR.
BY
ATTORNEY

INVENTORS
ROBERT D. HAWKINS
HAMILTON SOUTHWORTH JR.
BY

ATTORNEY

INVENTORS
ROBERT D. HAWKINS
HAMILTON SOUTHWORTH JR.
BY
ATTORNEY

United States Patent Office 3,093,367
Patented June 11, 1963

3,093,367
VIBRATION ATTENUATING COUPLING
Robert D. Hawkins, Greenlawn, and Hamilton Southworth, Jr., New York, N.Y., assignors to Sperry Rand Corporation, Great Neck, N.Y., a corporation of Delaware
Filed Mar. 16, 1961, Ser. No. 96,123
10 Claims. (Cl. 267—1)

This invention relates to a coupling of the type that includes a vibration isolator as an assembled element of the coupling between two spaced members. The isolator included in the coupling assembly is preferably a molded piece of resilient material having an egg crate type cell pattern of mutually bracing walls. Such an isolator as shown and described in pending U.S. application Serial No. 120, filed January 4, 1960, now Patent No. 3,049,-344, granted August 14, 1962, for Vibration Attenuating Mounting, by Robert D. Hawkins, provides the improved coupling with the shock isolating characteristics of a nonlinear spring.

In attenuating vibrations or shocks, the isolator in the improved coupling assembly compresses or buckles under dynamic load conditions where the spacing between the load members increases as well as where the members move transversely without changing their spacing. Accordingly, each of the coupled isolators functions individually regardless of the direction of the loading applied thereto so that it is no longer necessary to utilize the isolators in pairs as required in the mounting described in the heretofore identified application for Letters Patent. An object of the present invention is to provide a coupling assembly that obviates the need of using such isolators in pairs.

For use in devices where space and weight require special design considerations, an improved coupler of equivalent performance to a conventional vibration isolator requires less spacing between the coupled members and is considerably lighter.

The improved coupling assembly includes an isolator, a pair of spaced plates that contact the isolator, a pair of coupling pieces, and parallel spacing means that includes a pliant connection between one of the coupling pieces and one of the plates and a pliant connection between the other of the coupling pieces and the other of the plates by which the isolator is compressed between the plates under tensile and shear conditions of loading.

Figure 1:
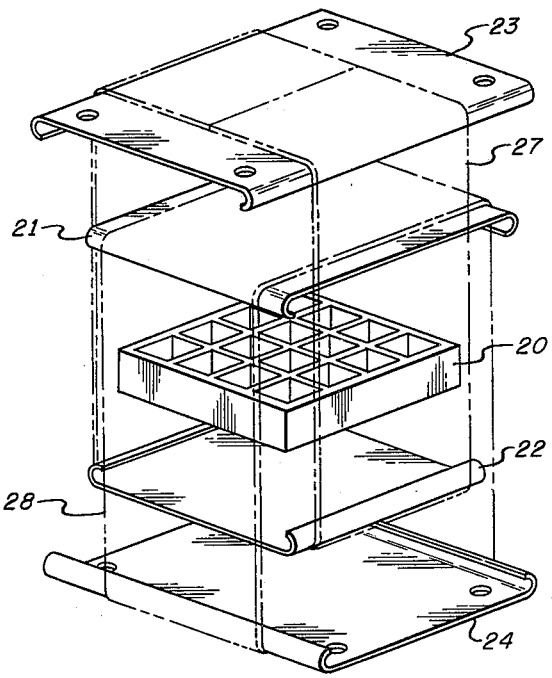
Figure 2:
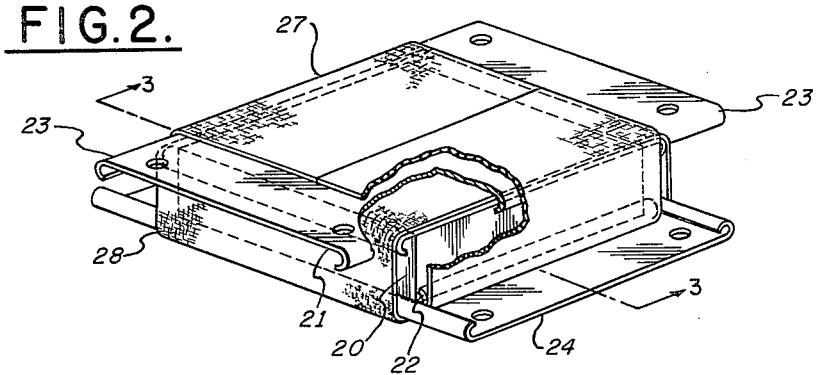
Figure 3:
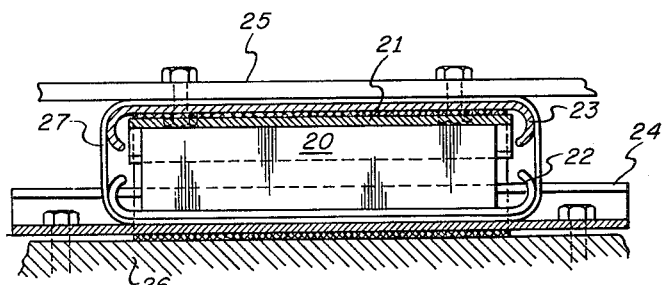

Further objects, advantages, features and structural details of the improved coupling will be apparent from the following description when read in relation to the accompanying drawings, wherein, FIG. 1 is a perspective view of a preferred embodiment of the structure constituting the improved coupling in which the spacing means thereof are provided by pliant straps showing the coupling pieces, plates and isolator components thereof in exploded relation, FIG. 2 is a perspective view of the assembled components shown in FIG. 1, FIG. 3 is a sectional view taken on line 3—3 in FIG. 2 showing the coupling sandwiched in operative condition between two spaced vibratory members.

Figure 4:
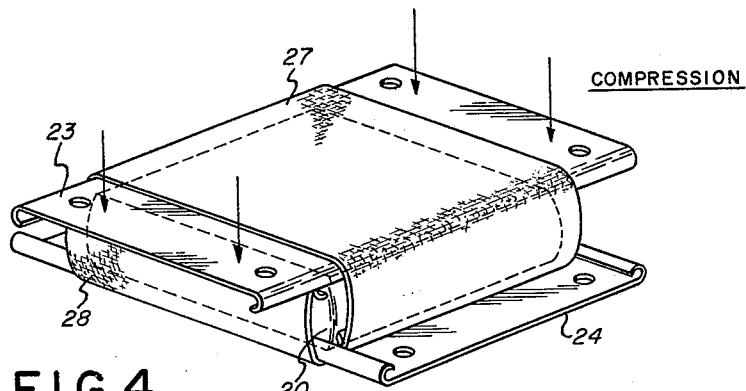
Figure 5:
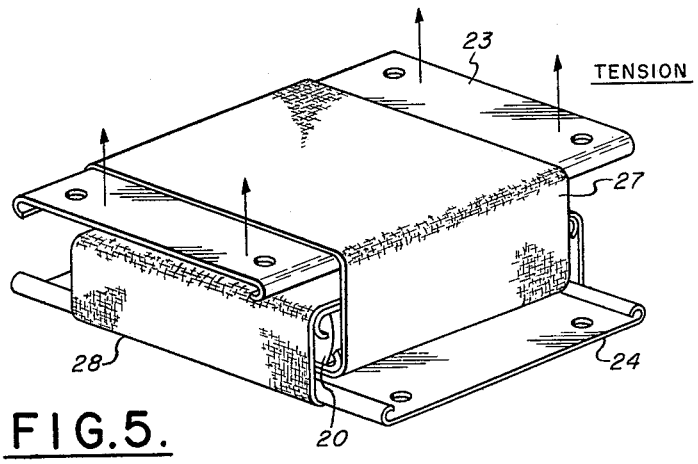
Figure 6:
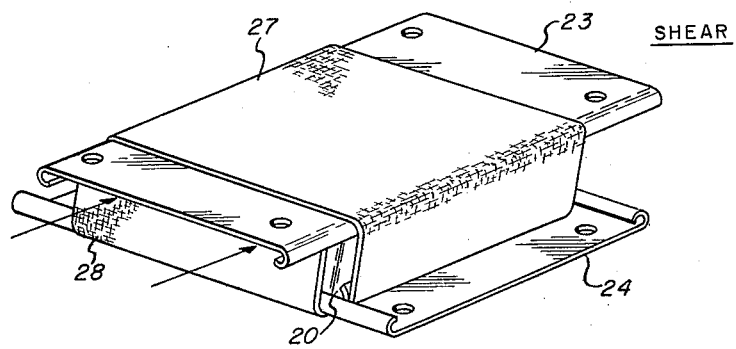
Figure 7:
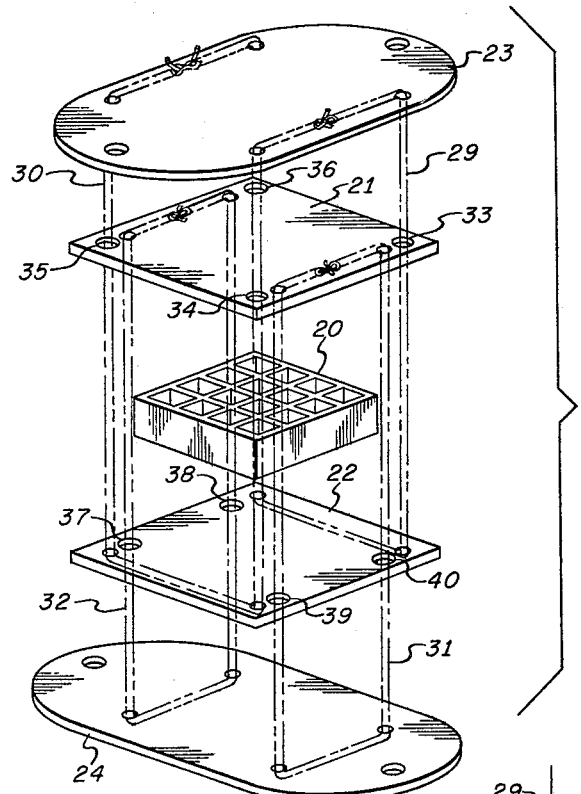
Figure 8:
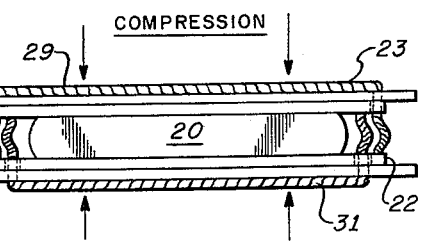
Figure 9:
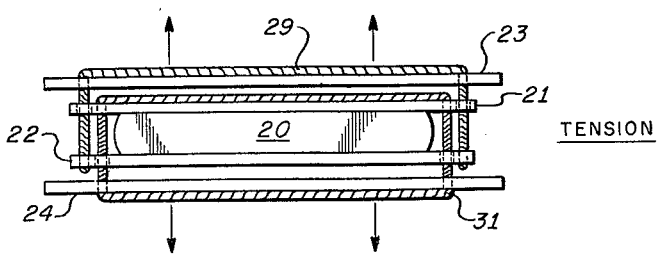
Figure 10:
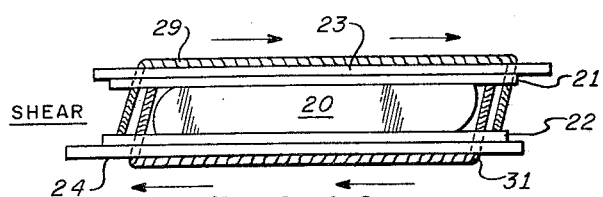

FIGS. 4, 5 and 6, are perspective views of the strap type coupling showing its operation with the isolator under load conditions of compression, tension and shear respectively, FIG. 7 is a perspective view of a modified form of the improved coupling in which the spacing means between the respective coupling pieces and plates includes a plurality of pliant tie lines of equal length and in which the components of the coupling are shown in exploded relation, and FIGS. 8, 9 and 10 are side elevation views of the tie line coupling isolator assembly showing its operation under load conditions of compression, tension and shear respectively.

As shown in FIGS. 1 and 7, the vibration isolating element of the improved coupling is provided by a compressible isolator 20 of resilient material. Preferably, the isolator 20 is provided by a molded piece of resilient material having an egg crate type cell pattern of mutually bracing walls as described in the heretofore identified application for U.S. Letters Patent. The physical dimensions of the isolator as well as the coupling in which it is assembled depends on the spacing between the members between which it is sandwiched as well as the load to be handled and the characteristics of the material. Silicone rubber pads of a one-fourth inch thickness have performed well in isolating vibration frequencies above forty-two cycles per second under operating loads up to seven pounds per square inch of isolator. Isolators of a one inch thickness have performed well in attenuating shocks under operating loads up to four pounds per square inch of isolator. The illustrative isolator shown in the drawings is a structure of cubic geometrical configuration of sixteen cells whose walls buckle under loading with the isolating characteristics of a nonlinear spring. The load bearing faces of the isolator 20 are parallel and normal to the bracing walls of its cell structure. The coupling provides a mounting by which the isolator is compressed under loading conditions of tension and shear as well as in compression.

As shown in the exploded views FIGS. 1 and 7, the improved coupling includes a pair of spaced plates 21 and 22, a pair of coupling pieces 23 and 24 and parallel spacing means that provides a pliant connection between the respective coupling piece 23 and plate 22 and coupling piece 24 and plate 21. The vibratory members 25 and 26 between which the coupling is sandwiched are spaced in parallel relation as indicated in FIG. 3. The coupling piece 23 is fixedly connected by suitable bolts or other fastening means to the member 25, the flat inner face of the piece being arranged in parallel relation to the respective spacing faces of the isolator 20. The coupling piece 24 of the coupling is also suitably connected to the other spaced member 26 with its flat inner face arranged in parallel relation to the respective spacing faces of the isolator. The coupling components and isolator are dimensioned in the instant case to fit in the spacing provided under zero load conditions between the members 25 and 26 to which the respective coupling pieces are fastened with the pieces movable longitudinally and transversely in relation to one another.

The plate 21 of the coupling is sandwiched between one of the spacing faces of the isolator 20 and the inner face of the coupling piece 23. As shown in FIGS. 2 and 3, one of the opposite flat faces of the plate 21 is sandwiched against one of the faces of the isolator 20 while the other is sandwiched against the inner face of the coupling piece 23 under zero load conditions. Likewise, plate 22 of the coupling is sandwiched between the other of the load faces of the isolator 20 and the inner face of the coupling piece 24. One of the opposite flat faces of the plate 22 in this instance, is sandwiched against the other of the faces of the pad 20 while the other of the faces is sandwiched against the inner face of the coupling piece 24 under zero load conditions. Where there is a compressive load on the isolator 20 as indicated by the arrows in FIGS. 4 and 8, the spacing between the members 25 and 26 decreases and the plates 21 and 22 compress the isolator 20 to a buckling condition as shown in the noted figures.

To compress the isolator 20 under vibratory conditions where there is a tension or shear load as indicated by the arrows in FIGS. 5, 6, 9 and 10, the coupling includes means for decreasing the zero load spacing between the respective plates 21 and 22 that comprises a first parallel spacing means providing a pliable connection between the coupling piece 23 and plate 22 and a second parallel spacing means providing a pliable connection between the coupling piece 24 and plate 21. As shown in FIGS. 1 through 6, the respective spacing means are provided by bands or straps 27 and 28 of a suitable fabric material such as nylon that may be coated with a suitable protective covering. Strap or band 27 which spaces plate 22 with relation to coupling piece 23 encircles the respective piece 23 and plate 22. The butted ends of the strap or band 27 may be stitched together or it may be fastened to the piece 23 and plate 22 by a suitable bonding cement. The similar strap 28 connecting the coupling piece 24 and plate 21 in fixedly spaced relation encircles the respective piece 24 and plate 21 of the coupling. Like strap 27, the strap 28 may be stitched together at its butted ends or the same may be fixedly attached to the piece 24 and plate 21 by a suitable bonding cement. In compressive loading of the isolator 20, the portion of the straps or bands 27 and 28 between the respective connected pieces and plates flex as indicated in FIG. 4 to permit the isolator 20 to be compressed. In the zero load condition of the coupling, the straps or bands 27 and 28 of the coupling are taut as indicated in FIGS. 2 and 3.

In the modification of the coupling shown in FIG. 7, the parallel spacing means is provided by tie lines 29, 30 of equal connecting length securing the coupling piece 23 to the plate 22, and similar tie lines 31 and 32 connecting the coupling piece 24 to the plate 21. The lines used may be suitable cording or rope with a protective coating or wire of a suitable pliant metal. In this form of the invention, suitable openings 33, 34 are provided in the plate 21 through which the connecting line 29 is threaded. The openings provided in plate 21 to accommodate line 30 are indicated at 35 and 36. Similar openings 37 and 38 and 39 and 40 are provided in the plate 22 of the coupling for the respective tie lines 32 and 31 connecting the piece 24 and plate 21. The connecting lengths of each of the tie lines provided is equal to fix the parallel space between the respective coupling piece 23 and plate 22 and coupling piece 24 and plate 21. Individual tie lines secured at their respective ends to the respective pieces and plates may be used in couplings of the character shown of a larger size. In the arrangement shown, a single piece of tied cording provides two of the four connecting lines required between the components. The length of the tie lines shown in FIG. 7 is such that the same are taut under conditions of static loading of the coupling. Accordingly, when the coupling is under compression loading as shown in FIG. 8, the connecting lines bend as indicated permitting the isolator 20 to be compressed. Normally, isolator 20 is slightly compressed under zero load conditions by action of the spacing means which are maintained taut. Where greater initial stiffness is desirable, the lengths of straps or line connections between the components are made shorter so as to increase the compression of the pad under zero load conditions.

As shown in FIGS. 5 and 9, the improved coupling operates to compress the isolator 20 under tensile conditions of loading where the spacing between the coupling pieces 23 and 24 increases. In this condition, the taut straps or lines between the piece 23 and plate 22 and between piece 24 and plate 21 narrows the spacing between the respective plates to compress the isolator as indicated. Under shear loading conditions as shown in FIGS. 6 and 10, the taut straps or lines provide a diagonal connection between the components that decreases the spacing between the plates to compress the isolator 20 as indicated. Accordingly, the straps and tie lines provided connect one of the plates to move in parallel relation to coupling piece 24 under tensile and shear conditions of loading. Also, the other of the plates of the coupling is similarly connected to the coupling piece 23. The elastic properties of the isolator 20 provides the force for restoring the coupling components to their initial zero load condition regardless of the type of vibratory load condition that it is subjected to. The coupling operates to compress the isolator under compressive as well as tensile and shear conditions of loading.

While the invention has been described in its preferred embodiments, it is to be understood that the words which have been used are words are description rather than of limitation and that changes within the purview of the appended claims may be made without departing from the true scope and spirit of the invention in its broader aspects.

What is claimed is:

1. A coupling for spaced vibratory members subject to compressive, tensile and shear conditions of loading including a compressible isolator of resilient material having parallel spacing faces, and means for mounting the isolator compressively between the spaced members including a first coupling piece for one of the vibratory members having a flat face arranged in parallel relation to the spacing faces of the isolator, a second coupling piece for the other of the vibratory members having a flat face arranged in parallel relation to the spacing faces of the isolator, a first plate with opposite flat sides sandwiched between the first coupling piece and isolator with one of its sides against one of the faces of the isolator and the other of its sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for decreasing the spacing between the respective parallel plates to compress the isolator under tensile and shear conditions of loading including first parallel spacing means providing a pliable connection between the first coupling piece and second plate and second parallel spacing means providing a pliable connection between the second coupling piece and first plate.

2. A coupling of the character claimed in claim 1, in which said first parallel spacing means is provided by tie lines of equal connecting length securing the first coupling piece to the second plate, and in which said second parallel spacing means is provided by tie lines of equal connecting length securing the second coupling piece to the first plate.

3. A coupling of the character claimed in claim 1, in which said first parallel spacing means is provided by a pliant band encircling the first coupling piece and the second plate, and in which said second parallel spacing means is provided by a pliant band encircling the second coupling piece and the first plate.

4. A coupling comprising a vibration isolator of resilient compressible material having parallel spacing faces, a first coupling piece having a flat face arranged in parallel relation to the spacing faces of the isolator, a second coupling piece movable longitudinally and transversely relative to the first coupling piece having a flat face arranged in parallel relation to the spacing faces of the isolator, a first plate with opposite flat sides sandwiched between the first coupling piece and isolator with one of its sides against one of the faces of the isolator and the other of the sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for compressing the isolator between the plates under tensile and shear conditions of loading including a first flexible parallel spacing connection between the first coupling piece and second plate and a second flexible parallel spacing connection between the second coupling piece and first plate.

5. A coupling of the character claimed in claim 4, in which said first parallel connection is provided by tie lines of equal lengths between the first coupling and the second plate, and in which said second parallel connection is provided by tie lines of equal length between the second coupling piece and the first plate.

6. A coupling of the character claimed in claim 4, in which said first parallel connection is provided by a strap between the first coupling piece and second plate, and in which said second parallel connection is provided by a strap between the second coupling piece and the first plate.

7. A coupling comprising a vibration isolator of resilient compressible material having parallel spacing faces, a first coupling piece having a flat face arranged in parallel relation to the spacing faces of the isolator, a second coupling piece movable longitudinally and transversely relative to the first coupling piece having a flat face arranged in parallel relation to the spacing faces of the isolator, a first plate with opposite flat sides sandwiched between the first coupling piece and isolator with one of its sides against one of the faces of the isolator and the other of its sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for compressing the isolator between the plates under tensile and shear conditions of loading including pliant tie lines of equal spacing length connecting the second plate to move in parallel relation to the first coupling piece and including pliant tie lines of equal spacing length connecting the first plate to move in parallel relation to the second coupling piece.

8. A coupling comprising a vibration isolator of resilient compressible material having parallel spacing faces, a first coupling piece having a flat face arranged in parallel relation to the spacing faces of the isolator, a second coupling piece movable longitudinally and transversely relative to the first coupling piece having a flat face arranged in parallel relation to the spacing faces of the isolator, a first plate with opposite flat sides sandwiched between the first coupling piece and isolator with one of its sides against one of the faces of the isolator and the other of its sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for compressing the isolator between the plates under tensile and shear conditions of loading including a pliant spacing strap connecting the second plate to move in parallel relation to the first coupling means and a pliant spacing strap connecting the first plate to move in parallel relation to the second coupling piece.

9. A coupling comprising a vibration isolator of rubber material having parallel spacing faces and an egg crate type cell pattern of mutually bracing walls, a first coupling piece having a flat face arranged in parallel relation to the spacing faces of the isolator, a second coupling piece movable longitudinally and transversely relative to the first coupling piece having a flat face arranged in parallel relation to the spacing faces of the isolator, a first plate with opposite flat sides sandwiched between the first coupling piece and isolator with one of its sides against one of the faces of the isolator and the other of its sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for compressing the isolator between the plates under tensile and shear conditions of loading including pliant tie lines of equal spacing length connecting the second plate to move in parallel relation to the first coupling piece and including pliant tie lines of equal spacing length connecting the first plate to move in parallel relation to the second coupling piece.

10. A coupling comprising a vibration isolator of rubber material having parallel spacing faces and an egg crate type cell pattern of mutually bracing walls, a first coupling piece having a flat face arranged in parallel relation to the spacing faces of the isolator, a second coupling piece movable longitudinally and transversely relative to the first coupling piece having a flat face arranged in parallel relation to the spacing faces of the isolator, a first plate with opposite flat sides sandwiched between the first coupling piece and isolator with one of its sides against one of the faces of the isolator and the other of its sides against the flat face of the first coupling piece under zero load conditions, a second plate with opposite flat sides sandwiched between the second coupling piece and isolator with one of its sides against the other face of the isolator and the other of its sides against the flat face of the second coupling piece under zero load conditions, and means for compressing the isolator between the plates under tensile and shear conditions of loading including a pliant spacing strap connecting the second plate to move in parallel relation to the first coupling means and a pliant spacing strap connecting the first plate to move in parallel relation to the second coupling piece.

References Cited in the file of this patent

UNITED STATES PATENTS

| | | |
|---|---|---|
| 1,744,551 | Karcher | Jan. 21, 1930 |
| 2,105,997 | Church | Jan. 18, 1938 |